(12) United States Patent
Raravikar et al.

(10) Patent No.: US 7,799,849 B2
(45) Date of Patent: Sep. 21, 2010

(54) METHOD TO FABRICATE SELF-HEALING MATERIAL

(75) Inventors: Nachiket R. Raravikar, Chandler, AZ (US); Nirupama Nirupama, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 533 days.

(21) Appl. No.: 11/769,625

(22) Filed: Jun. 27, 2007

(65) Prior Publication Data
US 2009/0005486 A1 Jan. 1, 2009

(51) Int. Cl.
*C08K 9/10* (2006.01)
(52) U.S. Cl. ...................................... 523/205
(58) Field of Classification Search .................. 523/205
See application file for complete search history.

(56) References Cited

U.S. PATENT DOCUMENTS

2008/0237822 A1 * 10/2008 Raravikar et al. ........... 257/684

* cited by examiner

*Primary Examiner*—Kuo-Liang Peng
(74) *Attorney, Agent, or Firm*—Blakely, Sokoloff, Taylor & Zafman LLP

(57) ABSTRACT

A self-healing composite material and a method to fabricate the self-healing microcapsules are illustrated. The self-healing microcapsules may be fabricated by mixing nanoscale material with a self-healing agent to form a self-healing mixture. The self-healing mixture may be encapsulated to form self-healing capsules which may be dispersed in a polymer to fabricate self-healing material.

15 Claims, 3 Drawing Sheets ic material. A catalyst 104 may be provided in the self-healing composite material to increase a rate of polymerization of a healing agent provided in the microcapsules 102, when self-healing agent comes into contact with the catalyst 104.

METHOD TO FABRICATE SELF-HEALING MATERIAL

BACKGROUND

Polymer based composite materials may be used for a large variety of semiconductor applications such as packaging. For packaging, composite materials are required to be strong and crack resistant. However, in the event of fracture or cracking, self-healing microcapsules in the polymer based composite materials may be used to seal the cracks and prolong the life of the material. Although the fracture may be healed by the self-healing agent present in the self-healing capsules, use of the capsule reduces the overall strength and modulus of the material.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

In the following detailed description, numerous specific details are described in order to provide a thorough understanding of the invention. However the present invention may be practiced without these specific details. In other instances, well known methods, procedures, components and circuits have not been described in detail so as not to obscure the present invention. Further, exemplary sizes, values and ranges may be given, but it should be understood that the present invention is not limited to these specific examples.

References in the specification to "one embodiment", "an embodiment", and "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
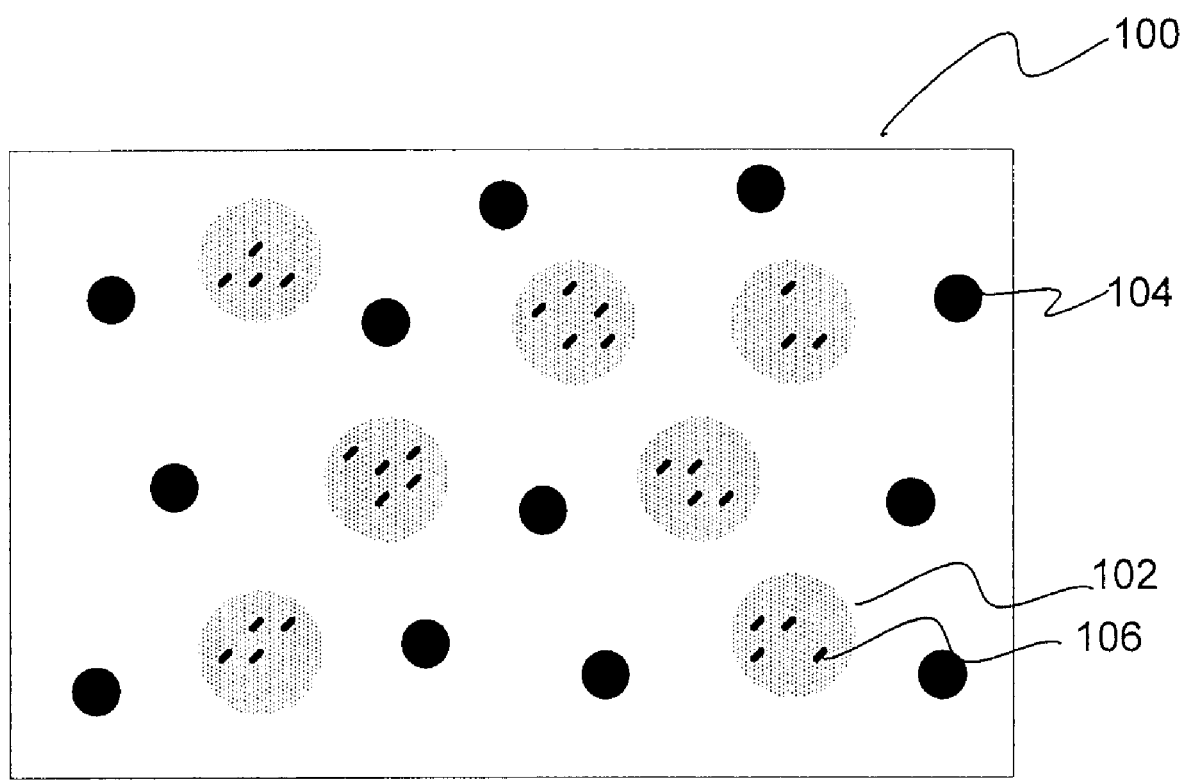
FIG. 1 illustrates an embodiment of a self-healing composite material.

Referring to FIG. 1, an embodiment of a self-healing material is illustrated. The self-healing composite material 100 may comprise a polymer embedded with self-healing microcapsules 102. A catalyst 104 may be provided in the self-healing composite material to increase a rate of polymerization of a healing agent provided in the microcapsules 102, when self-healing agent comes into contact with the catalyst 104.

A nanoscale material 106 may be provided in the microcapsule 102, mixed in with the self-healing agent. The nanoscale material 106 may comprise nanoparticles, such as alumina, silica, and zirconia. In one embodiment, the nanoscale material 106 may comprise nanoclay. In another embodiment the nanoscale material 106 may comprise a combination of nanoparticles and nanoclay. The self-healing agent may comprise, for example, dicyclopentadiene (DCPD).

The nanoscale material 106 may be mixed with the self-healing agent to form a self-healing mixture. The nanoscale material 106 may have a size of about 5 nanometers to about 500 nanometers (nm). In one embodiment, the size of the nanoscale material may be about 25 nm to about 100 nm. One of the advantages of the nanoscale material is that it may remain dispersed in the self-healing agent due to fine size of the nanoscale material. In contrast, larger scale material may tend to clump together in the microcapsule 102.

In one embodiment, the nanoscale material may improve polymer to polymer adhesion and may help strengthen healed resin and underfill/mould compound interface. In one embodiment, coefficient of thermal expansion (CTE) of the healed crack may be made consistent with the polymer and compatible with the underfill.

Figure 2:
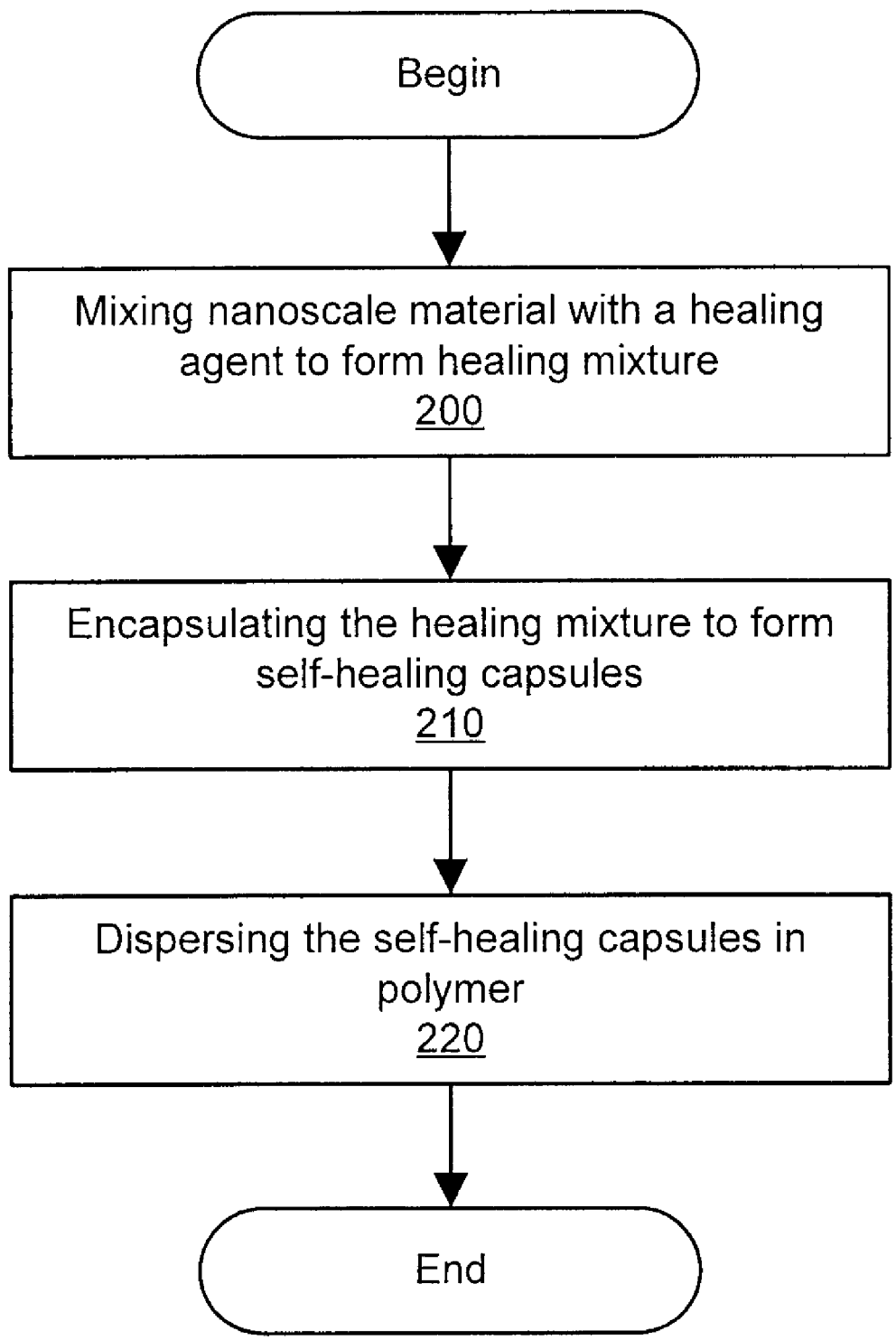
FIG. 2 illustrates an embodiment of a process of the present invention that may be implemented to produce self-healing composite material.

Reference is now made to FIG. 2, in which an embodiment of a process to produce self-healing composite is illustrated. As shown in a block 200, the nanoscale material may be mixed with a self-healing agent in the amount of about 1 weight percent to about 10 weight percent to form a self-healing mixture. In one embodiment, the nanoscale material may be treated with a coupling agent. The coupling agent may be, for example, alkyl-silane or organo-silane. In a block 210, the self-healing mixture may be encapsulated in urea formaldehyde to form a self-healing capsule, such as a microcapsule. The size of the self-healing capsules may be about 10 microns.

As shown in block 220, the self-healing capsules may be dispersed in a polymer to fabricate self-healing composite material. In one embodiment, the a catalyst may be dispersed in the polymer to aid in fabricating the self-healing composite material 100. The polymer may comprise an epoxy polymer. The catalyst particles may comprise Grubbs Ru catalyst particles.

Figure 3A:
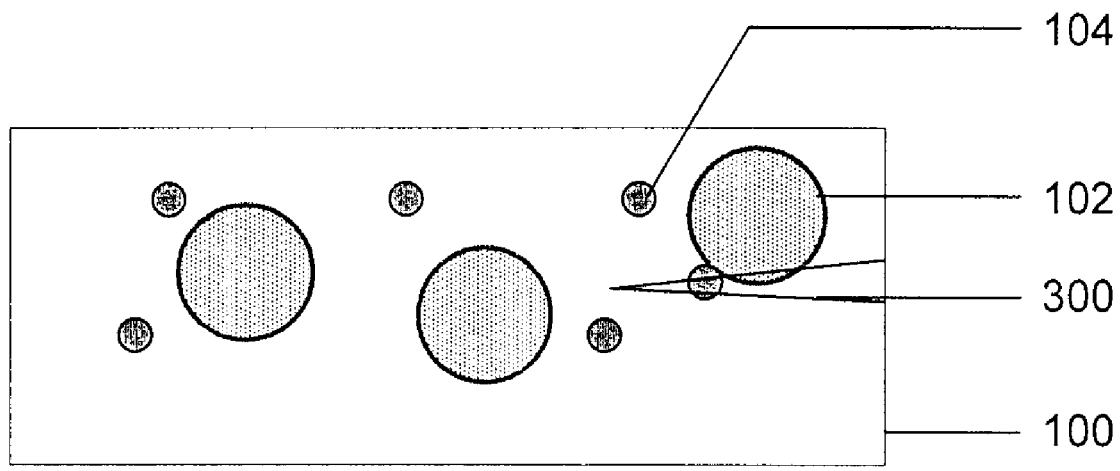
FIGS. 3A-3B illustrate a self-healing process of the self-healing composite material.
Figure 3B:
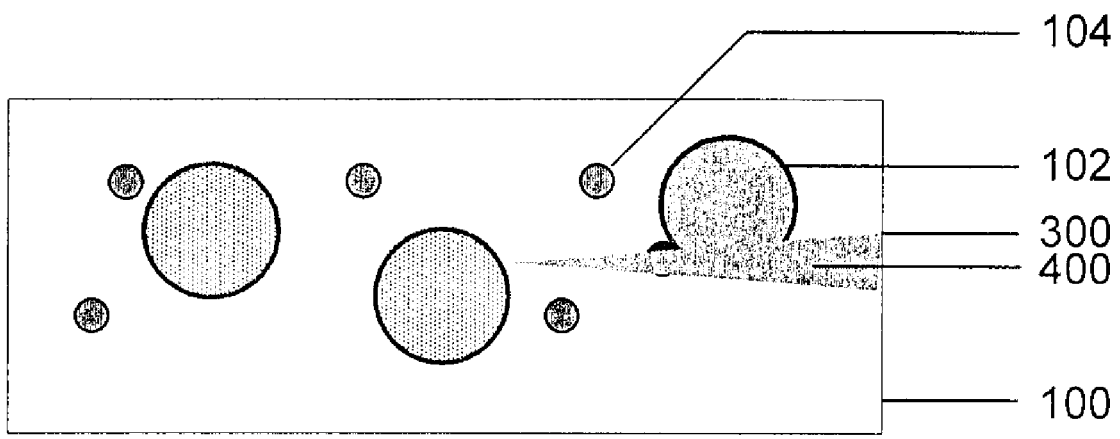

Referring to FIGS. 3A-3B, a process of self-healing and curing of a crack is illustrated according to one embodiment. As shown in FIG. 1, a crack 300 may develop in the composite material 100. The crack 300 may typically be about 1-2 micro size wide. The crack 300 may rupture the self-healing capsule 102, when the capsule 102 comes in contact with the propagating crack 300. When this occurs, the self-healing mixture may flow from the self-healing capsule 102 and start filling in the crack due to capillary action. The self-healing agent may come in contact with the catalyst 104 which may increase the rate of polymerization of the self-healing agent. The polymerization of the self-healing agent in the crack 300 may then seal the crack as shown in FIG. 3B.

In one embodiment, the composite material 100 having sealed crack was tested by a scanning electron microscopy (SEM) process and transmission electron microscopy (TEM) process and it was found that the sealed crack has similar toughness and modulus as of the polymer of the composite material 100. Also, it was observed that coefficient of thermal expansion (CTE) of the sealed crack was similar to that of the polymer of the composite material 100.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method to fabricate a self-healing material comprising:
   mixing nanoscale material with a healing agent to form a healing mixture;
   encapsulating the healing mixture to form a plurality of self-healing capsules; and
   dispersing the self-healing capsules in a polymer to fabricate the self-healing material.

2. The method of claim 1, wherein the nanoscale material comprises nanoparticles.

3. The method of claim 2, wherein the nanoparticles comprises one of a group consisting of alumina, silica, and zirconia.

4. The method of claim 2, wherein the nanoparticles have a dimension between about 25 nanometers to about 100 nanometers.

5. The method of claim 1, wherein the nanoscale material comprises nanoclay.

6. The method of claim 1, further comprising treating the nanoscale material with a coupling agent.

7. The method of claim 6, wherein the coupling agent comprises one of a group consisting of alkyl-silane and organo-silane.

8. The method of claim 1, wherein the weight percentage of nanoscale material in the healing mixture ranges from about 1 percent to about 10 percent.

9. A self-healing material comprising: a polymer, self-healing capsules dispersed in the polymer, wherein the self-healing capsules comprise a healing mixture, wherein the healing mixture is formed of nanoscale material and a healing agent; and catalyst capsules dispersed in the polymer.

10. The self-healing material of claim 9, wherein the nanoscale material comprises nanoparticles.

11. The self healing material of claim 10, wherein the nanoscale material comprises nanoclay.

12. The self-healing material of claim 11, wherein the nanoclay has a thickness of less than about 5 nanometers.

13. The self healing material of claim 9, wherein the weight percentage of the nanoscale material in the healing mixture ranges from about 1 percent to about percent.

14. The self-healing material of claim 13, wherein the self-healing material is an underfill layer having a coefficient of thermal expansion ranging from about 20 to about 30.

15. The self-healing material of claim 13, wherein the self-healing material is a mold compound having a coefficient of thermal expansion ranging from about 8 to about 10.

* * * * *